United States Patent [19]

Mühling et al.

[11] 4,295,380

[45] Oct. 20, 1981

[54] GEARING FOR A MOTOR DRIVEN TIMING RELAY

[75] Inventors: Alois Mühling, Pleinfeld; Frank Reissner; Helmut Schmidt, both of Nuremberg all of Fed. Rep. of Germany

[73] Assignee: Siemens Aktiengesellschaft, Berlin & Munich, Fed. Rep. of Germany

[21] Appl. No.: 936,946

[22] Filed: Aug. 25, 1978

[30] Foreign Application Priority Data

Sep. 9, 1977 [DE] Fed. Rep. of Germany ....... 2740743

[51] Int. Cl.² .......................... F16H 5/74; F16H 3/34

[52] U.S. Cl. .................................... 74/3.5; 335/75; 74/353

[58] Field of Search ................ 74/342, 318, 413, 319, 74/414, 320, 3.54, 380, 3.56, 381, 353, 878; 335/30, 73, 74, 75

[56] References Cited

U.S. PATENT DOCUMENTS

| | | | |
|---|---|---|---|
| 2,375,602 | 5/1945 | Wichham | 74/342 |
| 2,401,153 | 5/1946 | Hall | 335/73 |
| 2,775,904 | 1/1957 | Edwards | 74/878 X |
| 2,872,545 | 2/1959 | Hobbs | 335/74 X |
| 3,014,375 | 12/1961 | Bowen | 74/3.54 X |
| 3,110,880 | 11/1963 | Fieser | 74/342 X |
| 3,367,200 | 2/1968 | Cummings | 74/342 X |
| 3,518,894 | 7/1970 | Barron | 74/413 |
| 3,921,470 | 11/1975 | Mabuchi | 74/414 |
| 3,973,443 | 8/1976 | Muhling | 74/3.5 |

FOREIGN PATENT DOCUMENTS

| | | |
|---|---|---|
| 1959829 | of 0000 | Fed. Rep. of Germany . |
| 1203357 | of 0000 | Fed. Rep. of Germany . |
| 7617979 | of 0000 | Fed. Rep. of Germany . |

*Primary Examiner*—Nile C. Byers, Jr.

*Attorney, Agent, or Firm*—Kenyon & Kenyon

[57] ABSTRACT

The gearing for motor driven timing relays comprises an appropriate number of gear pairs which are in continuous engagement with each other and are rotatably mounted on a turntable which is driven by a setting shaft.

5 Claims, 3 Drawing Figures

GEARING FOR A MOTOR DRIVEN TIMING RELAY

BACKGROUND OF THE INVENTION

The invention relates to gearing for motor driven timing relays of single and multiple range design. In motor driven timing relays of this type, a switching gear is driven by a synchronous motor via a gear box. The speed of an a.c. fed synchronous motor is stepped down by means of a multistage gear box so that the switching gear rotates by a given angle which is proportional to the set running time. This angle is as a rule smaller than 360°. The gear box consists of a number of gear pairs which are in cascaded engagement with each other. The choice of the timing range is accomplished by inserting a predetermined number of gear pairs between the motor pinion and the switching gear. This choice can be accomplished in various ways. As a rule, the gear pairs, which are in continuous engagement with each other, are arranged in a stationary manner, the coupling between the gear pairs and the pinion of the coupling shaft being accomplished by one or several intermediate gears. In one known design, the individual gear pairs are arranged concentrically about the switching shaft and the individual timing ranges are taken off in 6 steps by a so-called traveling pinion which is rotatably supported on a rotatable disc. The range is set by means of a setting shaft which cooperates via a pinion with teeth on the rotatable disc. For exact adjustment the rotatable disc is further provided with detents which interact with a detent spring or the like.

In another known design, the gear pairs meshing with each other are arranged on two parallel shafts in cascade fashion, and a pinion whose shaft is fastened to the rotatable disc is associated with each gear pair. The pinions themselves are again connected to the drive motor via a traveling pinion.

In another design, the continuously meshing gear pairs are again arranged on two parallel shafts in cascade fashion and cooperate with pinions which are rotatably supported on a rotatable disc. Output pinions which are in driving connection with a pinion of the coupling shaft are fastened at the other end of the rotatable shafts.

In these designs of the gearing, the relatively high cost of the parts and the production quality required to ensure reliable functioning with a tolerance chain corresponding in length to the length of the chain of cooperating parts are all disadvantages.

SUMMARY OF THE INVENTION

It is an object of the invention to provide simple gearing for a motor driven, multiple range timing relay having a tolerance chain as short as possible and which also has very substantial advantage as a single range timing relay. According to the invention, an appropriate number of continuously meshing pairs of gears is arranged about the motor pinion or the driving shaft on a turntable. The turntable is driven by a setting shaft, bringing one of the gear pairs into direct engagement with the pinion of a rotatable output coupling shaft, depending on the time range. The need to interpose radially adjustable pinions at different heights to switch the time range is therefore obviated. Also obviated is a common pinion which must be relatively long axially in order to establish the connection between the pinions and the coupling shaft.

DETAILED DESCRIPTION OF THE INVENTION

Figure 1:
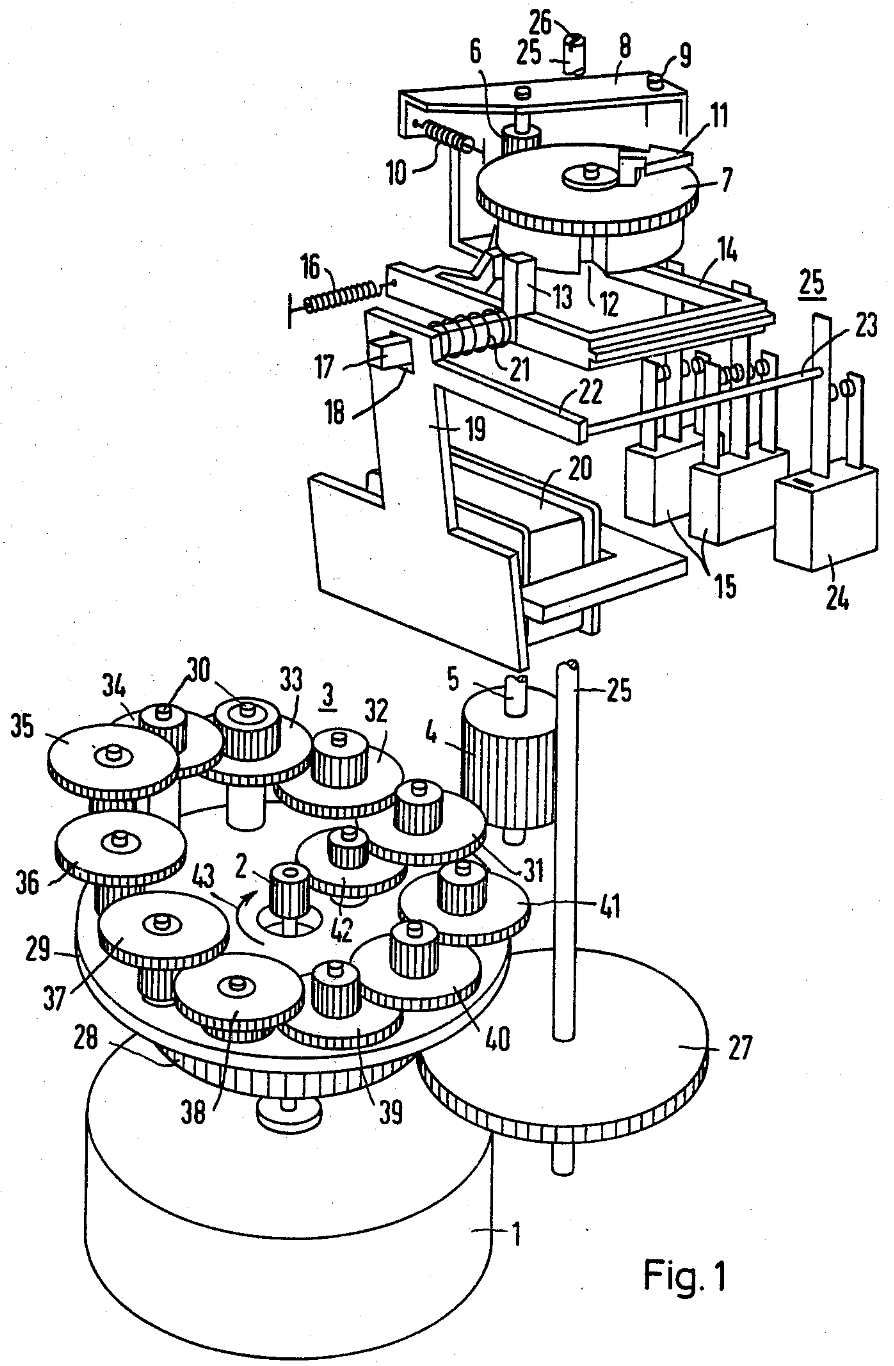
FIG. 1 is a perspective view of an embodiment of the invention showing a six range timing relay.

In FIG. 1, the motor 1 drives, via a pinion 2 and a gear box 3, a rotatable coupling shaft 5. The upper end of the coupling shaft 5 carries a pinion 6 which is moved into engagement with the teeth of a switching gear 7 in the usual manner by means of a coupling lever 8. The coupling lever 8 pivots about a shaft 9 and maintains engagement of pinion 6 and gear 7 under the action of a spring 10.

The switching gear 7 has a pointer 11 for setting the time. The switching gear 7 also has a slot 12, which can receive projecting part 13 of a radially movable frame 14 for actuating relay contacts 15. A restoring spring is indicated by 16. The frame 14 has a guide arm 17, which can pass through a cutout 18 in an armature 19 of a relay 20. A spring 21 is carried on guide arm 17 between the armature 19 and the frame 14. A switch contact 24 is actuated directly via an arm 22 of the armature 19 and a pin 23.

A setting shaft 25 has a screwdriver slot 26 at its upper end for setting the time delays. The lower end of the setting shaft 25 is provided with a gear wheel 27 which meshes with the teeth 28 of a turntable 29.

Gear support posts 30 are disposed concentrically about motor pinion 2 on turntable 29 and carry continuously meshing gear pairs 31 to 41. These pairs of gears are directly driven by the motor pinion 2 via gear pair 42. As shown in the drawings, each gear pair consists of a gear wheel and a pinion conveniently fastened to one another and rotatably mounted on a post 30; conventional means are used to space the gear pairs so as to minimize friction from overlapping parts. In the position shown in FIG. 1, the motor pinion 2 is connected directly to the pinion 4 of the coupling shaft 5 via the gear pairs 42 and 31. This provides the smallest time setting of, say, 6 seconds. If the turntable 29 is now rotated in the direction of the arrow 43 and, for instance, the coupling pinion 4 is brought into engagement with the gear pair 33, a range of the timing relay of 60 seconds would be set. If the pinion 4 is coupled to the gear pair 35, a time range of 6 minutes could be set; if coupled to the gear pair 37, a time range of 60 minutes; if coupled to the gear pair 39, a time range of 6 hours; and if coupled to the gear pair 41, a time range of 60 hours.

The arrangement on the turntable of the gear train in circular sequence around the motor drive shaft and pinion 2 permits a particularly compact disposition of the gear train, reducing the height of the gear box and the axial length of take-off pinion 4. As will be seen in FIG. 1, this result is achieved by taking advantage of the stepped nature of the gear pairs to reverse adjacent gears at intervals and so control the gradual displacement of the locus of gear intersections away from or towards the turntable 29. Thus, inversion of gear pair 36 results in reversal of a trend away from the turntable to one going towards it, and inversion of gear pair 39 starts the trend away again.

In operation, if voltage is applied to the timing relay of FIG. 1, the coil of the relay 20 is energized and the armature 19 is rotated clockwise, compressing the spring 21. This results in closing of the switch contact 24 via the arm 23, so that voltage is applied to the motor 1. The latter now drives the pinion 4 and coupling shaft 5 via the motor pinion 2 and the gear pairs 42 and 31; from the pinion coupling shaft 5 it drives the switching gear 7. At the end of the pre-set time the arm 13 of the frame 14, urged by the decompression of spring 21, drops into the slot 12 of the switching gear 7, so that the double throw contacts 15 are actuated accordingly. As soon as the relay 20 is without voltage, the frame 14 is returned to its starting position by the action of the restoring spring 16, releasing the double throw contacts of the contactor 15 as well as the contact 24. Also, the arm 13 is lifted out of the slot 12 of the switching gear 7, so that the latter is returned to the starting position shown in FIG. 1 by the action of a restoring spring, not shown in the drawing.

Figure 2:
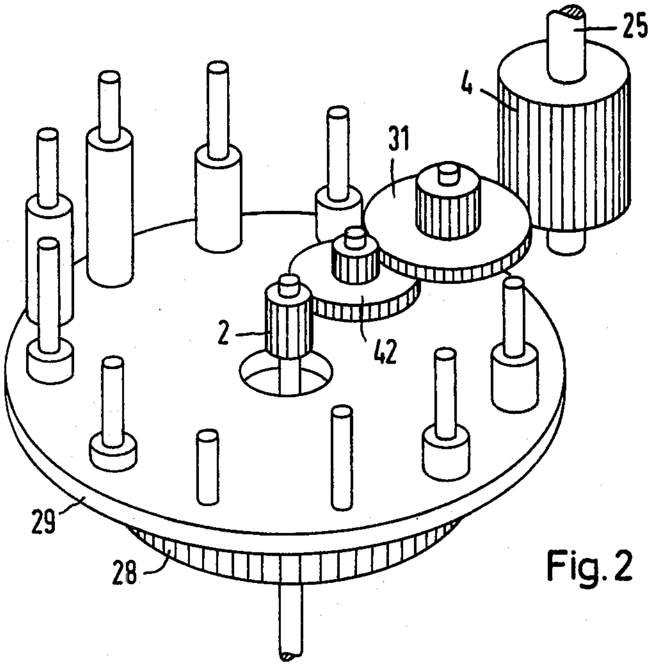
FIG. 2 is a perspective view of the gearing sequence for a single range timing relay.

FIG. 2 shows the embodiment of the gearing in a timing relay having only one adjustment range. To this end, the gear box need not be equipped completely, it being sufficient to insert only the gear pair 31. Since only one range is provided, the setting wheel and the adjustment shaft 25 can also be omitted.

Figure 3:
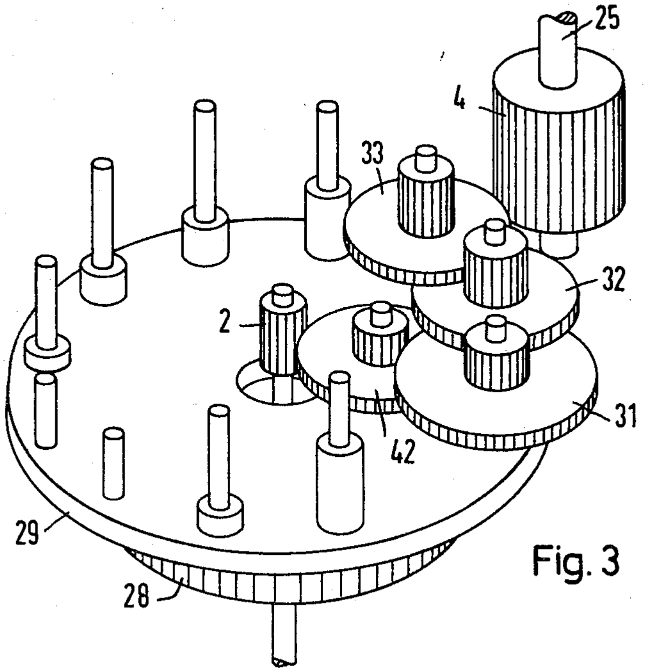
FIG. 3 is a perspective view of the gearing sequence in a timing relay having a single range or a dual range.

In FIG. 3, an embodiment is shown which can be used as a single or a dual range timing relay, as desired. For a time range of 60 seconds, the gear pairs 31 to 33 are inserted. For the single-range embodiment, the adjustment shaft 25 can be omitted.

In a similar manner, the setting range can be varied to 6 minutes, 60 minutes, 6 hours and 60 hours and, if desired, the designs can be manufactured as single range timing relays or as three, four, five and six range timing relays; so too, with any degree of complementing, all shorter time ranges can also be taken off, provided the setting shaft 25 is installed.

Through this kind of building-block system, the number of parts can be reduced very considerably from the present relay designs. The time range steps of 1:10 and 1:6 make it possible to use a gear box with largely identical gear pairs.

So that the individual turntable positions can be occupied exactly, the turntable 29 is provided with appropriate detents. Since this structure is well-known in the arts, it is not specifically shown in the drawing.

What is claimed is:

1. Gearing for motor driven, single and multiple timing relays comprising:
- a turntable adapted for rotation about a drive pinion carried on a drive shaft;
- a coupling pinion adjacent to the turntable;
- a plurality of continuously meshing gear pairs rotatably supported on the turntable and coupled to the drive pinion, with only every second gear pair adapted to be brought into engagement with the coupling pinion; and
- a setting shaft for moving the turntable to bring any one of the second gear pairs into engagement with the coupling pinion, whereby the time range is set.

2. Gearing according to claim 1 in which the turntable has detent positions equal in number to the maximum number of time ranges provided by the second gear pairs, and detent means for positioning the turntable at each second gear pair.

3. Gearing in accordance with claim 2 in which each gear pair is rotatably supported on a post mounted on the turntable, each post having its axis lying parallel to the driving shaft.

4. Gearing in accordance with claim 2 wherein the turntable is provided with drive teeth and further comprising a gear wheel carried on the setting shaft and engaging the drive teeth on the turntable.

5. Gearing for a motor driven, multiple range timing relay including:
- a turntable having a motor driven shaft mounted coaxially therewith,
- a coupling pinion adjacent to the turntable;
- a chain of cascaded gear pairs having a first gear pair and at least one more driven gear pair rotatably carried on posts which are fastened by one end to the turntable, being parallel to the motor driven shaft, only every second gear pair positioned on the turntable for engagement with the coupling pinion,
- a pinion on the drive shaft engaging the first of the gear pairs, and
- a drive for indexing the turntable so as to engage any one of the driven second gear pairs with the coupling pinion, whereby the timing range of the relay is set.

* * * * *